Patented July 27, 1948

2,446,135

UNITED STATES PATENT OFFICE 2,446,135

PROCESS FOR PREPARING METHYL SILOXANES

James Franklin Hyde, Corning, N. Y., assignor to Corning Glass Works, Corning, N. Y., a corporation of New York No Drawing. Application April 13, 1944, Serial No. 530,949

3 Claims. (Cl. 260—46.5)

This invention relates to methyl siloxanes and methods of preparing them, and, more particularly, to the products obtained by the hydrolysis of mixtures of hydrolyzable silanes.

This application is a continuation-in-part of my co-pending applications Serial No. 432,528, filed February 26, 1942 and Serial No. 483,448 filed April 17, 1943.

The hydrolysis of a monosilane of the formula $SiX_4$, where X is a hydrolyzable radical, such as halogen, acyloxy, alkoxy, hydrogen, amino, etc., does not result in a simple hydroxy compound but produces instead a brittle, insoluble, infusible siliceous mass comprising a three-dimensional network of structural units composed of siloxane linkages as a result of the concurrent or subsequent loss of water from the intermediately formed hydroxy compound.

*Type I*

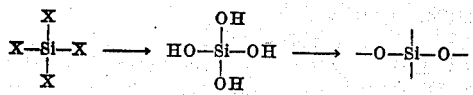

The formation of a siloxane linkage generally results from the close approach of two hydroxyl groups and subsequent elimination of water. It may also result from the close approach of one hydroxyl group to a hydrolyzable group such as halogen, acyloxy or alkoxy and subsequent elimination of hydrogen halide, carboxylic acid or alcohol, respectively. Such eliminations are catalyzed by mineral acids, especially hydrochloric and sulfuric and by alkali metal hydroxides, especially sodium hydroxide. It is apparent that, in the formation of such a rigid structure, many hydroxyl groups become isolated and block some of the possible cross linkages. As the structural network becomes more complicated, dehydration becomes increasingly more difficult, and the result is a partially dehydrated siliceous mass of poor dimensional stability.

Methyl-substituted silanes of the formula $(CH_3)_2SiY_2$ can be prepared by means of the well-known Grignard reaction where Y is a hydrolyzable radical such as hydrogen, halogen, alkoxy, aroxy, acyloxy, etc. By hydrolyzable radical is meant, in general, any radical which is attached to silicon by other than carbon-silicon linkage and which under the same set of conditions is more readily hydrolyzed than a methyl radical attached to silicon. Such silanes may be hydrolyzed and dehydrated, the dehydration probably proceeding to some extent concurrently with the hydrolysis, particularly if the temperature is allowed to rise.

*Type II*

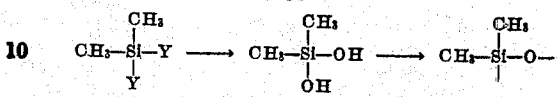

In each structural unit two of the four silicon bonds are now blocked by the methyl radicals, and only two siloxane linkages are possible. Hence a three-dimensional network is no longer possible and the resulting liquid or solid polymers can comprise only chain and cyclic structures. The final products bear little physical resemblance to silicic acid but are closely related thereto in chemical structure, differing only in the restriction of possible siloxane linkages.

Prior attempts to utilize the above described reactions have not contemplated combinations thereof, but have been confined more or less to the individual reactions and their products. Such products have limited utility and the range of properties obtainable in the products of a given type of reaction is relatively restricted.

The primary object of my invention is to provide a method of copolymerizing the hydrolysis product of a compound having the general formula $SiX_4$ with the hydrolysis product of a compound having the general formula $(CH_3)_2SiY_2$ where each X and Y is a hydrolyzable radical.

Another object of my invention is to hydrolyze a mixture comprising essentially a compound having the general formula $SiX_4$ and a compound having the general formula $(CH_3)_2SiY_2$.

Still another object of my invention is to prepare methyl siloxanes comprising substantially entirely oxygen atoms and recurring units which correspond to the formulae $=Si=$ and

said units being joined by the oxygen atoms thru silicon-oxygen linkages

Another object of the present invention is to prepare liquid methyl siloxanes of high viscosity.

Still another object of my invention is to prepare methyl siloxanes which are heat convertible and soluble in organic solvents.

A still further object of this invention is to prepare methyl siloxanes which are substantially infusible and insoluble resins.

My new method comprises mixing at least one compound of the formula $SiX_4$ with at least one compound of the formula $(CH_3)_2SiY_2$ where each X and each Y is a hydrolyzable radical and causing them to hydrolyze together and to become cocondensed. It is to be understood that each of the silanes is present in appreciable quantity, i. e., in amount sufficient to produce a perceptible effect on the properties of the resulting intercondensate. One method of accomplishing intercondensation is by introducing into the mixture by dropwise addition thereto the amount of water which is calculated for complete hydrolysis of the mixture and which preferably is dissolved in from two or four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Also in order to better control the properties of the resulting product it is desirable to have the starting materials substantially pure, or at least free of other hydrolyzable compounds which tend to produce unwanted copolymeric combinations.

In a mixture of hydrolyzable silanes containing at least one non-organosubstituted silane and a dimethylsilane, hydrolysis and dehydration by this method will result in copolymerization or formation of interconnecting oxygen linkages between the silicon atoms of the various silanes.

If the hydrolyzable groups of all of the compounds in the mixture to be hydrolyzed are halogens, it is preferable to employ dioxan as the solvent because it is inert to the halogens. If the mixture contains both halogen and alkoxy groups, the former can be converted to the latter by the slow addition of dry alcohol to the mixture, or the mixture can be diluted with dioxan and treated with aqueous alcohol. When the mixture contains only alkoxy groups, any water miscible solvent may be used together with a trace of acid, such as HCl, as catalyst. In this case, alcohol may be preferred on account of its relatively low cost. Mixtures of water miscible solvents may be used.

In the above described method, the slow incorporation of water into the homogeneous solution ensures that hydrolysis is not permitted to proceed unchecked, whereby the more reactive silane or silanes, that is, silanes containing no substituted organic radicals per silicon atom, would be more completely hydrolyzed and condensed before the less reactive or more highly substituted silanes have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate intermolecular combination through siloxane linkages of silicon atoms becomes possible to the fullest extent. This ensures a true copolymerization with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The copolymers which can be produced by my method may be represented as combinations of the units =Si— and

bearing in mind that these units are chemically combined with each other by siloxane linkages, that the percentage of each type of unit may be varied at will and that the properties of the resulting products will show corresponding variations which can be predicted in making compositions for a particular purpose. It should also be understood that the copolymers may also contain small percentages of unhydrolyzed radicals, such as chlorine and ethoxy, or of uncondensed hydroxyl radicals.

The partially dehydrated copolymers or hydrolysis products, after removal of solvents, are generally liquids of various viscosities which vary in the extent to which dehydration has occurred at this stage. The ease of dehydration and the physical properties of the copolymers vary with the final ratio of oxygen to silicon. Subsequent heating is usually necessary for complete dehydration. The extent of heating necessary depends upon the number of possible siloxane linkages, that is, the final oxygen to silicon ratio. Ease of dehydration increases as the average number of radicals per silicon atom increases or as the final oxygen to silicon ratio decreases. As the oxygen to silicon ratio increases from 1.0 to 1.3, there is a corresponding increase in molecular complexity or the number of siloxane linkages and an accompanying increase in viscosity. When the ratio is in the neighborhood of 1.3 the viscosity increases to such an extent that the copolymer is a thermoplastic solid which may be fused and solidified repeatedly by heating and cooling. As the oxygen to silicon ratio is increased to the neighborhood of 1.5 and beyond (approaching 2), the copolymers tend to become thermosetting.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of a copolymer for the desired purpose.

The following examples will illustrate the mode of operation of the process and the character of the resulting products.

Example 1

Equimolecular proportions of $Si(OC_2H_5)_4$, and $(CH_3)_2Si(OC_2H_5)_2$ were mixed and copolymerized by adding dropwise the calculated amount of water containing a trace of HCl and vigorously shaking the mixture. Evaporation gave a very viscous liquid, which gelled rapidly with further heating giving a weak rubbery resin which crumbled rapidly. A sample on a glass plate with moderate warming began to craze and flake off. When the initial hydrolysis mixture was rapidly treated with an excess of water, copolymerization did not occur but a gel similar to silica gel was precipitated.

Example 2

A copolymer was prepared from $Si(OC_2H_5)_4$ and $(CH_3)_2Si(OC_2H_5)_2$ in the molecular proportions of ⅓ by dropping in somewhat more than the calculated amount of water containing a trace of HCl. After evaporation, a transparent viscous oil remained which set very slowly and became a rubbery rather weak gel only after thirty-six hours of heating at 190° C.

Example 3

.1 mole of $Si(OC_2H_5)_4$ and .2 mole of $$(CH_3)_2Si(OC_2H_5)_2$$

were mixed and to the mixture was added dropwise the calculated amount of water (containing a drop of concentrated HCl) for complete hydrolysis. A viscous clear solution remained. After evaporation of the solvent a clear extremely tacky mass was left. A sample heated on a glass plate at 190° C. was still fluid after two to three hours. On heating for twenty hours, it finally gelled to a slightly rubbery film.

Example 4

A mixture of 4.4 grams of $(CH_3)_2Si(OC_2H_5)_2$ and 2.1 grams of $Si(OC_2H_5)_4$ in the molar ratio of three to one was diluted with an equal volume of dioxan and copolymerized by the slow addition of a 50% aqueous dioxan solution containing one drop of concentrated HCl. After hydrolysis was complete the solvents and water were removed at reduced pressure. This resulted in a tough gel which was almost entirely soluble in dioxan-ether solution. The copolymer was dissolved in dioxan and placed on glass tape. The sample was heated at 250° C. Heating for thirty minutes gave a soft resin. When heated in an aluminum dish at 180° C. for twelve hours the product set to a resin which was tough.

Example 5

A mixture of ethyl orthosilicate and dimethyldiethoxysilane in the molar ratio of 2 to 1 was dissolved in an alcohol-water mixture containing a trace of HCl. The solution was then added to a large excess of water. A viscous oil immediately precipitated which was freed of solvent and water by heating at 100° C. under vacuum. During the heating the oil set to a gel. In general, I have found that the molar ratio of the dimethyl silane to the unsubstituted silane should be greater than 1 to 1 if desirable resinous properties are to be obtained.

Although the above examples specifically illustrate only the ethoxy silanes, as previously pointed out other hydrolyzable radicals than ethoxy may be employed. For example, silicon tetrachloride and dimethylsilicon dichloride may be used as the two starting materials. Or if desired, different hydrolyzable radicals may be present in the same mixture. By way of example, the starting mixture may contain silicon tetrachloride and dimethyldiethoxysilane. The conditions for hydrolyzing the silanes should be modified in the manner indicated previously to take into account the degree of hydrolyzability of the respective radicals present, if the best results are to be obtained.

It will be seen that the copolymers produced by my method are not mixtures of individual polymers, but are new compounds differing therefrom in homogeneity of structure and properties. It will further be seen that the new polymers may contain on the average between zero and two methyl radicals attached to each silicon atom.

The copolymers produced by my method may be adapted to various uses and for any specific use the physical properties and characteristics of the product can be controlled by the proper selection of the initial starting materials so as to obtain the desired oxygen to silicon ratio or methyl to silicon ratio.

More viscous liquid products, such as those wherein the oxygen to silicon ratio lies in the neighborhood of 1.0 or more, may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed copolymers and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

I claim:

1. The method which consists in adding water containing an hydrolysis catalyst in successive increments to a mixture consisting of ethylorthosilicate and dimethyldiethoxysilane in the molar proportion of from 1:3 to 1:2, respectively, and thereafter recovering from the hydrolysis product the copolymeric organo-siloxane thereby produced.

2. The method which consists in adding water containing an hydrolysis catalyst in successive increments to a mixture consisting of ethylorthosilicate and dimethyldiethoxysilane in the molar proportion of 1:3, respectively, and thereafter recovering from the hydrolysis product the copolymeric organo-siloxane thereby produced.

3. The method which consists in adding water containing an hydrolysis catalyst in successive increments to a mixture consisting of ethyl orthosilicate and dimethyl diethoxy silane in the molar proportions of from 1:1 to 1:3, respectively, and thereafter recovering from the hydrolysis product the copolymeric organosiloxane thereby produced.

JAMES FRANKLIN HYDE.

(References on following page)

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,068 | Rochow | Mar. 6, 1945 |
| 2,375,998 | McGregor et al. | May 15, 1945 |
| 2,418,051 | Scott | Mar. 25, 1947 |

OTHER REFERENCES

Rochow: Chemistry of the Silicones, Wiley 1946, pp. 93 and 94.

Cusa et al.: J. Chem. Soc. (London), 1932, pp. 2205 to 2209.

Meads et al.: J. Chem. Soc. (London), 1913, pp. 679 to 690.

Kipping: J. Chem Soc. London (1928), pages 1427 and 1429.